(12) United States Patent
Lee et al.

(10) Patent No.: US 6,792,030 B2
(45) Date of Patent: *Sep. 14, 2004

(54) METHOD AND APPARATUS FOR DELIVERING NON-OBTRUSIVE DATA SERVICES BY SPREAD SPECTRUM MODULATION

(75) Inventors: Michael C. G. Lee, Ottawa (CA); Frederic Simard, Nepean (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/412,439

(22) Filed: Oct. 5, 1999

(65) Prior Publication Data

US 2003/0086478 A1 May 8, 2003

(51) Int. Cl.[7] .............................................. H04B 1/69
(52) U.S. Cl. ..................... 375/130; 375/222; 379/88.21
(58) Field of Search ................................ 375/140, 141, 375/222, 145; 370/493, 494, 495; 379/93.01, 93.09, 142.01, 88.19, 88.2, 88.21, 93.23

(56) References Cited

U.S. PATENT DOCUMENTS

| 3,586,781 A | * | 6/1971 | Jones | 370/298 |
|---|---|---|---|---|
| 4,757,495 A | * | 7/1988 | Decker et al. | 370/477 |
| 5,263,084 A | | 11/1993 | Chaput et al. | 379/215 |
| 5,404,377 A | * | 4/1995 | Moses | 375/141 |
| 5,432,815 A | * | 7/1995 | Kang et al. | 375/145 |
| 5,836,009 A | | 11/1998 | Diamond et al. | 379/93.23 |
| 5,970,127 A | * | 10/1999 | Smith et al. | 379/142.01 |

* cited by examiner

*Primary Examiner*—Don N. Vo (57) ABSTRACT

The invention provides a method and apparatus for establishing a non-obtrusive data channel within a voice communication channel to transmit data during an audio transmission without disruption. This audio transmission can be for example, an audio conversation between a first and a second party. The invention uses spread spectrum modulation to hide the reception and transmission of data from the first and second party and allow the ongoing conversation to proceed uninterrupted. In a preferred embodiment, the invention is used to provide an enhanced call waiting feature whereby caller identifying (ID) information of a third party is transmitted over a telephone line from a local central office (CO) to a first party engaged in a telephone conversation with a second party. Advantageously, the use of spread spectrum modulation to transmit data in a voice channel carrying a telephone conversation prevents any interruption in the on-going conversation and does not result in any noticeable disruption.

31 Claims, 3 Drawing Sheets

METHOD AND APPARATUS FOR DELIVERING NON-OBTRUSIVE DATA SERVICES BY SPREAD SPECTRUM MODULATION

FIELD OF THE INVENTION

The present invention is directed to the delivery of data services over a voice communication channel and more particularly to the telephonic delivery of data services by spread spectrum modulation.

BACKGROUND OF THE INVENTION

The telecommunications industry is currently experiencing a growing demand for systems in which data can be transmitted in analog audio communication channels such as, for example telephone lines during concurrent audio transmissions. These systems substantially improve user connectivity and flexibility as data can be transmitted over existing band-limited links normally used for audio without monopolizing the limited transmission bandwidth available. An important application that can use concurrent audio and data transmission relates to the delivery of off-hook and on-hook data services to telephone subscribers.

As is well known, off-hook data services currently available are all characterized by the exchange of information over an analog audio communication channel (e.g. a telephone line) between a central office and a subscriber already engaged in a telephonic conversation with a third party.

Presently, many telephone companies offer off-hook data services to telephone subscribers. The variety of services is continually increasing and new services are constantly developed to enhance the flexibility and functionality of conventional telephone networks and facilitate the integration of emerging technologies. Examples of off-hook services include call waiting, E-mail messaging, weather and stock reporting services. In addition to off-hook services, many on-hook services are also available such as caller ID and distinctive alerting (or ringing) of different phones attached to the same telephone loop.

With respect to off-hook services, certain constraints affect the service quality that can be offered. Apart from the inherent bandwidth restrictions of conventional subscriber lines, an important constraint affecting off-hook data services relates to the on-going telephonic conversation carried out by the subscriber. Normally, when a subscriber is on a telephone call with a second party, the analog audio signal takes the full bandwidth of the telephone channel. This makes it difficult to transmit data reliably without affecting the on-going conversation between the subscriber and the third party.

A popular technique currently used to transmit data during a telephonic conversation is disclosed in U.S. Pat. No. 4,873,719 entitled "Spontaneous caller identification with call-waiting" which issued on Jul. 22, 1991 to Chaput, et al. The method disclosed therein is used to transmit spontaneous call waiting identification (SCWID) information with respect to an incoming call to a subscriber during a phone conversation. According to this method, a short tone is first sent to the subscriber to mute the audio path and the SCWID data is then inserted for transmission during the period of muting. Muting the audio path prevents the SCWID data sent from being distorted by the subscriber's voice. However, this method causes disruptions in the conversation and can be quite intrusive. It has been shown that with such method, conversations can be disrupted for up to half a second each time information is sent to the subscriber. This can become quite annoying if, depending on the type of service provided, frequent interruptions occur. This would certainly be true of any data reporting service frequently transmitting data to the subscriber. For such services, the method disclosed would not be suitable due to the frequent half-second interruptions that would result.

SUMMARY OF THE INVENTION

The present invention addresses these issues and to this end provides a methodology and apparatus to mitigate the present limitations in this art.

The invention provides a method and apparatus for establishing by spread spectrum modulation a non-obtrusive data channel within a voice communication channel to transmit data during an audio transmission. The invention can be incorporated in any communication system where it is desirable to transmit data from a transmitter to a receiver via an analog audio communication channel without disrupting or interrupting any concurrent audio transmission. This audio transmission can be for example, an audio conversation between a first and a second party. By using spread spectrum modulation, the reception and transmission of data can be hidden from the first and second party and allow the ongoing conversation to proceed uninterrupted.

In a preferred embodiment, the invention is used to provide an enhanced call waiting feature whereby caller identifying (ID) information of a third party is transmitted over a telephone line from a local central office (CO) to a subscriber set used by a first subscriber engaged in a telephone conversation with a second subscriber. According to the invention, the local CO and the subscriber set each have in addition to standard telephonic equipment, a pair of analog-to-digital (A/D) and digital-to-analog (D/A) converters, a digital signal processor (DSP) block and a microprocessor.

At the CO, the caller ID information is assembled in the microprocessor into a data message which is then passed on to the DSP block in the form of a digital bit stream. In the DSP block, the digital bit stream is digitally spread (or expanded) by assigning a larger code to each "1" and "0" in the stream to produce a spread spectrum modulated signal. This spread spectrum modulated signal is then used to modulate a carrier located within the telephone line pass band. Preferably, a quadrature phase shift keying (QPSK) modulation scheme is used for this. The carrier modulation process is performed by the DSP block which then supplies the resulting data stream to the D/A converter for transmitting the spread spectrum modulated data over the telephone line to the first party. The spread spectrum modulated data is transmitted superimposed on the audio information to form a subscriber line signal.

At the subscriber set, the subscriber line signal is continuously monitored by the DSP block and the microprocessor during an on-going audio call in the event any spread spectrum modulated data is sent by the local CO. For this, the subscriber line signal is digitized by the A/D converter and passed to the DSP block. In the DSP block, the digitized subscriber line signal is initially band pass filtered, QPSK demodulated and subsequently spread spectrum correlated to retrieve the data message sent by the local CO. The data message can then be processed by the microprocessor to extract and display the caller ID information to alert the first party that a third party is calling.

Advantageously, the use of spread spectrum modulation to transmit data in a voice channel carrying a telephone conversation prevents any interruption in the on-going conversation and does not result in any noticeable disruption. In the preferred embodiment, the information relating to the third party can advantageously be presented to the first party engaged in the telephone conversation in a very non-obtrusive and transparent manner. With the exception of a minimal amount of "white noise" in the background, the first party will not be aware that data is being received or sent.

The invention can advantageously be used for a variety of off-hook services including, but not limited to call waiting, E-mail messaging, weather and stock reporting services. In addition, the invention can also be used for many on-hook services such as caller ID and distinctive alerting (or ringing) of different phones attached to the same telephone loop.

Preferably, for any spread spectrum modulated data transaction between the CO and the telephone set, the CO initially transmits at a nominal power level to accommodate any subscriber loop length. When spread spectrum modulated data is transmitted, the subscriber set operates to measure the power level of the data received. Based on the measurement made, the subscriber set can instruct the CO to raise or lower the spread spectrum modulated data transmit power for optimal reception at the subscriber set.

According to the invention, the CO transmit power can also be controlled without any measurement feedback from the subscriber set. Instead, dual tone multi-frequency (DTMF) signals sent by the subscriber set as it receives a telephone call can be used by the CO to adjust its spread spectrum modulated data transmit power. According to this method, the CO can measure the level of the DTMF signals it receives from the subscriber set using known DSP techniques to estimate the length of the subscriber's telephone line. With knowledge of the approximate subscriber line length, the CO can then send spread spectrum modulated data at the appropriate transmit power level for optimal reception at the subscriber set.

By controlling the transmit power, any variation of the transmission conditions such as loop length variations can advantageously be compensated such that at the subscriber set, the spread spectrum modulated data is always received at an optimum level.

DETAILED DESCRIPTION OF THE PREFERRED EMBODIMENTS

The present invention provides a method and apparatus to establish a non-obtrusive data channel in a voice communication channel for transmitting data during audio transmissions. The invention uses spread spectrum modulation to render the reception and transmission of data virtually unnoticeable to any party involved in the audio transmissions such that on-going conversations can proceed uninterrupted. The invention is described below in relation to the public switched telephone network (PSTN) and in particular, to the delivery of data services to telephone subscribers. However, it is understood that the invention is not limited thereto and can be incorporated in any communication system where it is desirable to transmit data from a transmitter to a receiver via an analog audio communication channel without disrupting or interrupting concurrent audio transmissions.

In a preferred embodiment, the invention is used to exchange data between a central office and a first subscriber engaged in a telephonic conversation with a second subscriber. The manner in which data is exchanged according to this invention can be used for a variety of off-hook services including, but not limited to call waiting, E-mail messaging, weather and stock reporting services. Advantegeously, the invention can also be used for on-hook services such as caller ID and distinctive alerting (or ringing) of different phones attached to the same telephone loop. For simplicity however, the preferred embodiment will only be described below in relation to off-hook services according to which data transfers to a first subscriber conversing with a second subscriber via a local central office are used to signal that a third party is attempting to reach the first subscriber.

Figure 1:
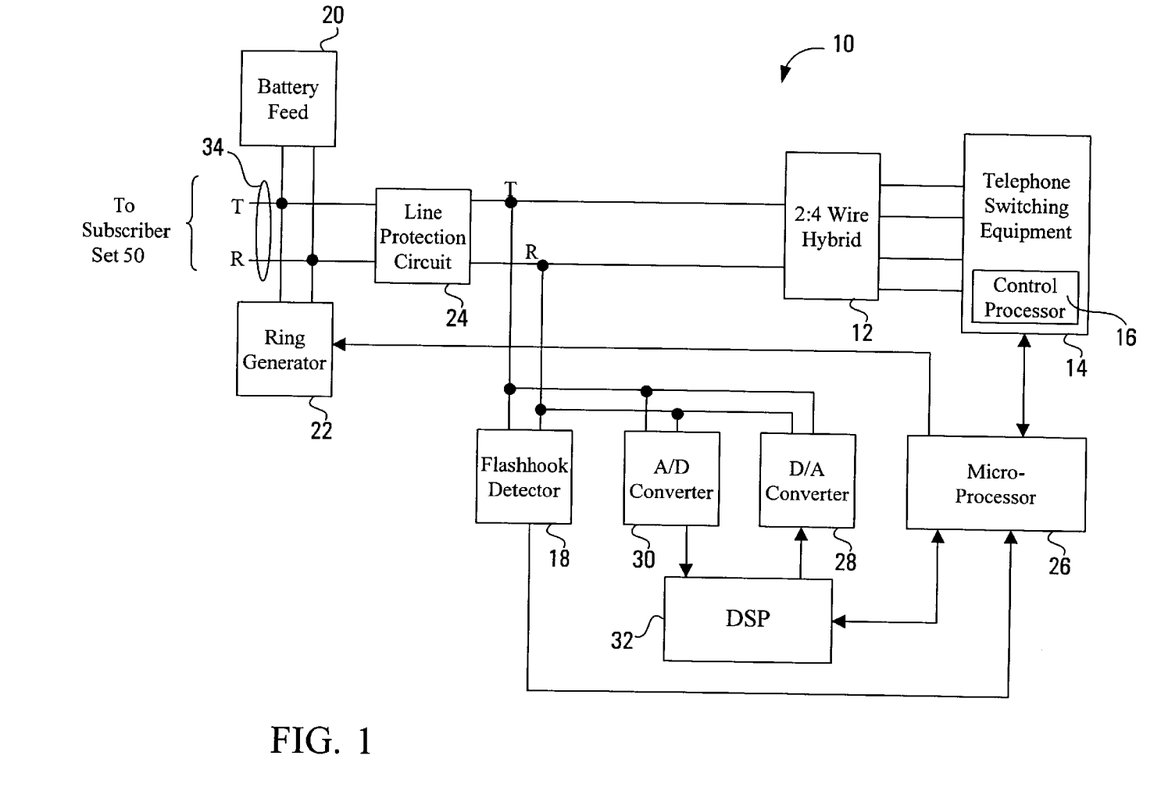
FIG. 1 is a block diagram of a local central office (CO) according to a preferred embodiment of the invention.

Referring firstly to FIG. 1, there is illustrated a block diagram of at least a portion of a local central office (CO) 10 designed according to a preferred embodiment of the invention to transmit data to the first subscriber for signaling an incoming call from a third party. As is conventional, the local CO 10 has standard telephone switching equipment 14 which typically includes a control processor 16. For the purpose of this description, this switching equipment 14 is said to be operative for processing and routing calls to and from the first subscriber.

The switching equipment 14 is connected in a full duplex configuration to a 2:4 wire hybrid circuit 12 (hereinafter the "hybrid circuit") which interfaces the full duplex connection to a tip lead and a ring lead respectively denoted in FIG. 1 as T and R. The tip and ring leads are coupled to a flashhook detector 18 and are also connected through a line protection circuit 24 to protect the CO equipment. Past the line protection circuit 24, the tip and ring leads form a subscriber line 34 which is used to link the first subscriber to the local CO 10. The subscriber line 34 is a standard telephone line with a limited pass band extending from 50 Hz to 3500 Hz which confines the (audio and data) information conveyed to and from the first subscriber on the subscriber line 34 (hereinafter the "subscriber line signal") to this particular frequency range.

The CO 10 has connected to the subscriber line 34 a battery block 20 for providing a power supply on the tip and ring leads. Also connected to the subscriber line 34 is a ring generator 22 to alert the subscriber that an incoming call has been received at the local CO 10.

The CO equipment described above is standard telephonic equipment and, as such is well known in the art. In addition to this equipment, the local CO 10 further has a digital-to-analog (D/A) converter 28, an analog-to-digital (A/D) converter 30, a digital signal processor (DSP) block 32 and a processing unit 26 such as, for example, a microprocessor all interconnected on a protected side of the line protection circuit 24. As will be seen below in further detail, this additional equipment is necessary for transmitting and receiving data to and from the first subscriber. If necessary, this additional equipment could also be used for data transmissions with other subscribers.

The processing unit 26 (hereinafter referred to as a microprocessor) is interconnected with the switching equipment 14 to control the ring generator and the DSP block 32. The D/A and A/D converters 28, 30 are each connected to the protected tip and ring leads and also to the DSP block 32 via serial data lines. The A/D converter 30 converts analog data present on the tip and ring leads in a digital form for use by the DSP block 32. Conversely, the D/A converter 28 converts digital data received from the DSP block 32 into an analog signal which can then be impressed on the protected tip and ring leads and superimposed thereto on the subscriber line signal for transmission to the first subscriber. The DSP block 32 is used in a standard manner to provide many conventional functions such as, for example, dual-tone multi frequency (DTMF) reception. According to the invention, the DSP block 32 also performs a number of additional functions including spread spectrum modulation, spread spectrum correlation and power control. These new DSP functions will be explained below in further detail.

While the first subscriber is engaged in an on-going conversation via the subscriber line 34, the local CO 10 can simultaneously exchange data with the first subscriber via the same subscriber line 34 to signal that a third party is attempting to reach the first subscriber. As will be explained below in further detail, the data to be exchanged is spread spectrum modulated before transmission such that it can be transmitted without disrupting or interrupting the on-going conversation the first subscriber is engaged in.

When a third party is attempting to reach the first subscriber already engaged in a conversation, an incoming call is generated by the third party and directed to the local CO 10. Upon detecting the incoming call from the third party, the local CO 10 enters into what is hereinafter referred to as an off-hook call waiting procedure. According to this procedure, a call processing function (not shown but typically residing in the telephone switching equipment 14) executes a call processing software program by which the local CO 10 receives at the control processor 16 of the switching equipment 14 the name and number of the third party calling. This information is then forwarded to the microprocessor 26. The microprocessor 26 combines the name and number of the third party calling to form a digital message and sends this digital message to the DSP block 32 in the form of a data stream.

In the DSP block 32, the data stream is initially spread spectrum modulated to spread the stream spectrum over a larger spectral band equivalent to the entire subscriber line pass band or a substantial portion thereof (further details below). More specifically, the data stream spectrum is digitally spread (or expanded) by assigning a larger code to each "1" and "0". According to the invention, the DSP block 32 replaces each "1" in the data stream by a unique N-bit pattern. Similarly, the DSP 32 replaces each "0" with the inverse of the unique N-bit pattern used for each "1". Preferably, a 69-bit pattern is used for the spread and is chosen to have an approximately equal number of ones and zeros. This digital spreading produces a spread spectrum modulated signal which has a much higher stream rate compared to the original data stream. For example, if the original data stream represents 100 bits per second and is spread spectrum modulated with a 69-bit pattern, the resulting spread spectrum modulated stream will be 6900 bits per second.

The resulting spread spectrum modulated signal is then used to digitally modulate a carrier for placing the spread spectrum signal spectrum within the subscriber line pass band. Preferably, the carrier used is a 1775 Hz frequency carrier located in the center of the subscriber line pass band. In accordance with the invention, various digital modulation schemes can be used to accomplish this. For the purpose of example, it is hereinafter assumed that quadrature phase shift keying (QPSK) modulation is used.

The spread spectrum modulated signal is QPSK modulated in the DSP block 32 producing a QPSK signal located within the subscriber line bandwidth. After carrying out a QPSK modulation, the spread spectrum modulated signal is converted by the D/A converter 28 into an analog form, applied to the tip and ring leads of the subscriber line 34 and superimposed thereto on the audio call for transmission to the first subscriber.

Figure 2A:
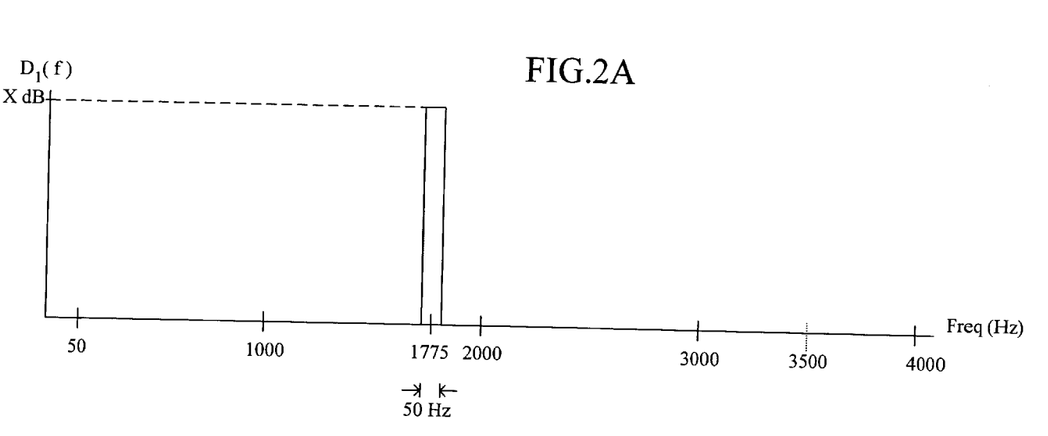
FIG. 2A illustrates a power spectrum diagram $D_1(f)$ of a QPSK data message before spread spectrum modulation.

To further illustrate the use of spread spectrum modulation as a non-intrusive means to transmit data on the subscriber line during an on-going audio call, reference is now made to FIG. 2A where a first power spectrum diagram denoted by $D_1(f)$ illustrates a QPSK data message with no spread spectrum modulation applied which would be used to transmit data at a rate of 100 bit/second using a QSPK 0.5 Hz/bit modulation scheme. For the purpose of comparison, reference is also made to FIG. 2B where a second power spectrum denoted by $D_2(f)$ shows the QPSK data message of FIG. 2A with spread spectrum modulation previously applied which would be used in accordance with the present invention to transmit data at the same rate of 100 bit/second with the same QSPK 0.5 Hz/bit modulation scheme. These power spectrum diagrams $D_1(f)$ and $D_2(f)$ are both shown in relation to the subscriber line pass band (50 Hz to 3500 Hz).

Figure 2B:
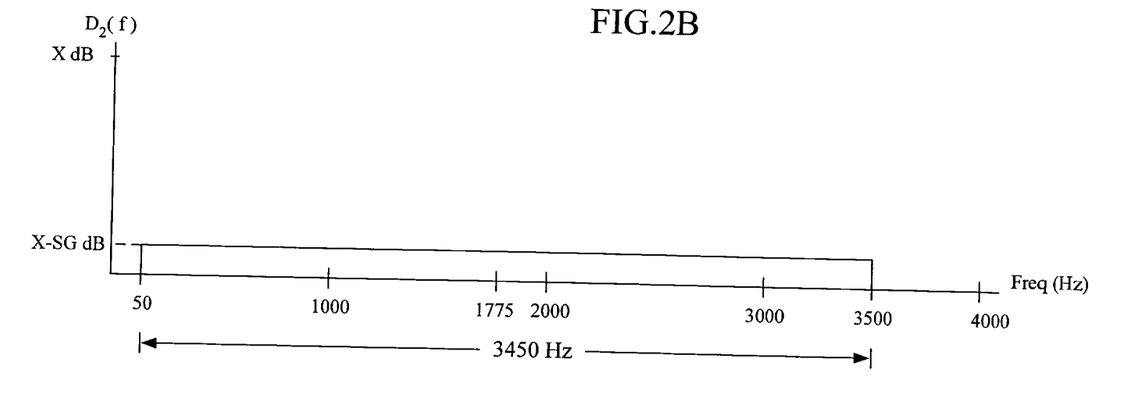
FIG. 2B illustrates a power spectrum diagram $D_2(f)$ of the QPSK data message shown in FIG. 2A after spread spectrum modulation.

In this particular example, if no spread spectrum modulation is used before transmission (see $D_1(f)$), the QPSK data message would normally require a bandwidth of 50 Hz centered at 1775 Hz and a power amplitude of XdB defining a power spectral density P. When spread spectrum modulation is used before transmission (see $D_2(f)$), the QPSK data message spectrum is spread over the entire subscriber line pass band from 50 Hz to 3500 Hz and lies at a reduced amplitude X−SG dB where SG is the spreading gain (further details below). By using spread spectrum modulation, the interference created by the spread spectrum modulated data is spread evenly across the subscriber line pass band at the reduced amplitude X−SG dB therefore resulting in "quasi-white noise" introduced in the audio call. In comparison to data signals with a more limited frequency content and higher amplitudes, this quasi-white noise is advantageously not as noticeable to the subscribers engaged in the audio call.

Spreading the QPSK data message spectrum over the entire subscriber line pass band (or a substantial portion thereof) does not alter the power spectral density P of the QPSK data message necessary for proper transmission of the data. In contrast to transmission schemes where no spread spectrum modulation is used, the QPSK data message can be transmitted at a reduced power amplitude (X−SG dB) than would otherwise be required (XdB) to produce the same power spectral density P. As will be explained below in further detail, transmitting at this lower power level improves the signal-to-noise (SNR) of the audio information and permits a non-intrusive and secure transmission of the data without having to mute the audio call in progress.

Figure 3:
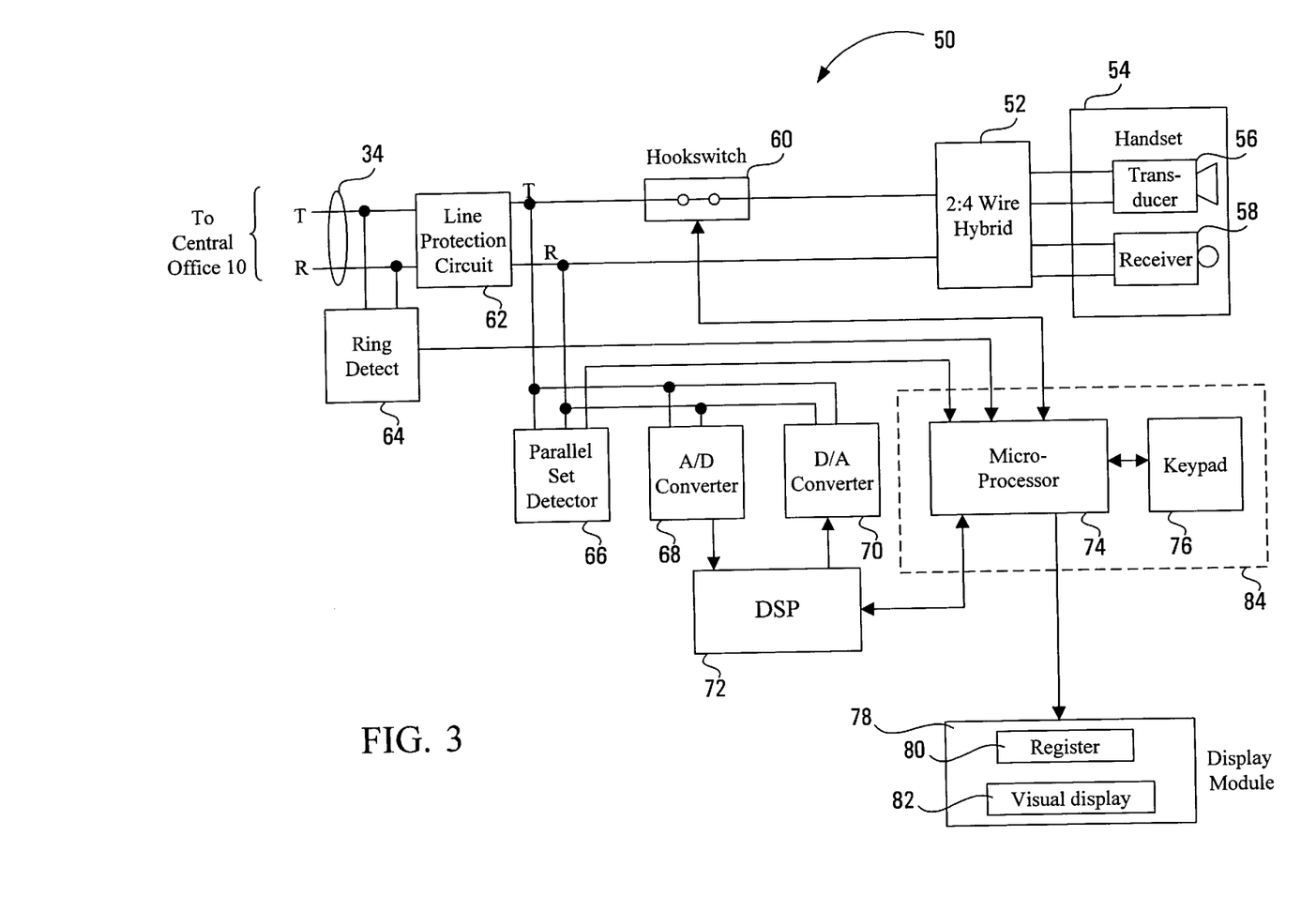
FIG. 3 is a block diagram of a telephone subscriber set connected to the local CO of FIG. 1 according to the preferred embodiment of the invention.

Referring to FIG. 3, there is illustrated a block diagram of at least a portion of a subscriber set 50 (hereinafter also referred to as the "set") required by the first subscriber to exchange data with the local CO 10 according to the preferred embodiment. The set 50 is connected to the local CO 10 via the subscriber line 34 defined with the tip and ring leads.

As is conventional, the set 50 includes a line protection circuit 62 connected to the tip and ring leads of the subscriber line to protect the set 50 from any line overload. The tip and ring leads of the subscriber line 34 are also connected to a ring detection circuit 64 for providing visual and/or audible alerting signals to the first subscriber when a call is received.

On a protected side of the line protection circuit 62, the tip and ring leads (hereinafter referred to as the "protected leads") are coupled to a 2:4 wire hybrid circuit 52. More specifically, the protected tip lead is connected to the hybrid circuit 52 via a hook switch 60 while the protected ring lead is directly connected thereto. The hybrid circuit 52 is, in turn, connected to a handset 54 which comprises a transmitter 56 and a receiver 58.

The subscriber set 50 also has a parallel set detector 66 coupled to the line protection circuit 62 to receive the protected tip and ring leads. The parallel set detector circuit 66 functions in a conventional manner to provide an output signal that indicates whether or not the subscriber set 50 is connected with any off-hook extension set (not shown).

Similarly to the local CO 10 of FIG. 1, the subscriber set 50 also has connected to the protected tip and ring leads an A/D converter 68 and a D/A converter 70. The A/D and D/A converters 68, 70 are connected to a digital signal processor (DSP) block 72 via respective serial data lines. The A/D converter 68 converts the analog signal present on the tip and ring leads in a digital form for use by the DSP block 72. The D/A converter 70 converts digital data received from the DSP block 72 into an analog signal which can then be impressed on the protected tip and ring leads. Similarly to the DSP block 32 of the local CO 10 shown in FIG. 1, the DSP block 72 is used for DTMF generation, spread spectrum modulation, spread spectrum correlation and power control (further details below).

The subscriber set 50 also has a control circuit generally denoted by 84 and formed of a processing unit 74 (e.g. a microprocessor) interconnected with a conventional keypad 76. The processing unit 74 (hereinafter referred to as a microprocessor) is connected to control and communicate with the ring detection circuit 64, the parallel set detector 66, DSP block 72, the hookswitch 60 and a display module 78 which includes a register 80 and a standard visual display unit 82. The visual display unit 82 may be formed of one or more rows and each display row may have in turn a plurality N of cells for displaying information received from the local CO 10.

During an on-going audio call between the first subscriber and a second subscriber, the subscriber set 50 processes the audio information contained in the subscriber line signal so that the first and second subscriber can carry out a conversation. The manner in which this is done is well known in the art and is not described here in any detail.

In addition to this standard processing, the subscriber line signal carried by the subscriber line 34 is also continuously monitored by the DSP block 72 and the microprocessor 74 in the event any spread spectrum modulated data is sent by the local CO 10. For this, the subscriber line signal is digitized by the A/D converter 68 and passed to the DSP block 72. In the DSP block 72, the digitized subscriber line signal is initially band pass filtered to eliminate frequencies located outside the 50 Hz to 3500 Hz range. Following filtering, the digitized subscriber line signal is QPSK demodulated and subsequently spread spectrum correlated with the known N-bit pattern used in the local CO 10 to retrieve the data stream sent. By performing a spread spectrum correlation on the digitized subscriber line signal, any spread spectrum data sent by the local CO 10 can be extracted from the subscriber line signal and acted upon if necessary.

Apart from the inherent bandwidth limitations of the subscriber line 34, the transmission rate at which data can be exchanged between the local CO 10 and the subscriber set 50 is dependant upon the digital modulating scheme chosen and the signal-to-noise ratio (SNR) of the audio call. Conversely, for a predetermined transmission rate and a particular digital modulation scheme, the SNR for the audio information can be determined. Preferably, the transmission rate and the digital modulation scheme are selected to obtain a sufficiently high SNR such that the interference or level of noise brought about by the presence of the spread spectrum modulated data in the subscriber line signal will not disrupt the audio call in progress.

For example, if a transmission rate of 100 bits per second (bit/s) is desired and FSK (frequency shift keying) modulation is used providing a spectrum efficiency of 2 Hz per bit, the resulting SNR for the audio call can be established by determining first the maximum spreading gain that the transmission channel will allow using the following formula:

$$\text{Spreading gain} = 10 \log(BW_1/BW_2);$$

where $BW_1$ is the usable transmission bandwidth available on the subscriber line 34 and $BW_2$ is the bandwidth required for FSK modulation. For a 100 bit/s transmission rate, the bandwidth required by a 2 Hz/bit FSK modulation scheme is given by:

$$BW_2 = 2 \text{ Hz/bit} * 100 \text{ bit/s};$$
$$= 200 \text{ Hz};$$

assuming a usable transmission bandwidth of 3500 Hz, the maximum spreading gain is calculated as follows:

$$\text{Spreading gain} = 10 \log(3500/200);$$
$$= 12.4 \text{ dB}$$

Once the spreading gain is known, the resulting SNR for the audio call at the subscriber set 50 can be determined as follows:

$$SNR = \text{speech signal level (dB)} - \text{spread spectrum modulated data signal level (dB)}$$

Assuming that the subscriber set 50 has a modem sensitivity of −40 dBm and that the spread spectrum modulated signal is transmitted with a +5 dB margin above the subscriber set sensitivity level, the spread spectrum modulated data signal level is determined following a standard noise level calculation:

$$\text{spread spectrum modulated data signal level} =$$
$$+ \text{modem sensitivity}(-40dBm)$$
$$+ 5dB \text{ margin}(5dBm)$$
$$- \text{spreading gain}(12.4dB)$$
$$= -47.4dBm \text{ or } 42.6Brn$$

Assuming that the speech signal level is approximately −20 dBm or 70 dBrn, the SNR is calculated to be:

$$SNR = 70 dBrn - 42.6 dBrn$$
$$= 27.4 dB$$

A better SNR could be obtained for the same transmission rate (100 bit/s) with a more aggressive modulation scheme such as QPSK modulation which has a spectral efficiency of 0.5 Hz/bit. If QPSK modulation is used, the necessary bandwidth required by this particular modulation would be reduced to:

$$BW_2 = 0.5 \text{ Hz} * 100 = 50 \text{ Hz}$$

The associated maximum spreading gain calculated as described above would be:

$$\text{Spreading gain} = 10 \log (BW_1 / BW_2);$$
$$= 10 \log (3500/500);$$
$$= 18.5 dB$$

Making the same assumptions as above, the spread spectrum modulated data signal level corresponding to an 18.5 dB spreading gain would be:

spread spectrum modulated data signal level =

+modem sensitivity(−40dBm)
+5dB margin(5dBm)
−spreading gain(12.4dB)
= −53.6dBm or 36.5dBrn Still assuming for this example that the speech signal level is −20 dBm (70 dBrn), the resulting SNR calculated in the manner described above would be given by:

$$SNR = 70 dBrn - 36.5 dBrn$$
$$= 33.5 dB$$

The above calculations show that by spreading the spectrum of the data signal, the audio SNR can be substantially improved such that the transmission becomes virtually unnoticeable to the subscribers engaged in the audio call. As noted above, by using spread spectrum modulation, the interference created by the spread spectrum modulated data is spread evenly across the subscriber line pass band therefore resulting in "quasi-white noise" introduced in the audio call. In comparison to signals with a more limited frequency content and higher amplitudes, this quasi-white noise is advantageously not as noticeable to the subscribers engaged in the audio call. According to the invention, the transmit power level of the spread spectrum modulated data can also be controlled to ensure that only the power necessary to properly detect and recover the data at the subscriber set 50 is used. This in turn ensures that the spread spectrum modulated data received at the subscriber set 50 is as small in amplitude as possible for providing the minimum possible noise level at the subscriber set 50.

According to the present invention, the power level of the spread spectrum modulated data is controlled by the local CO 10 based on feedback information received from the subscriber set 50. For any data transaction between the CO 10 and the subscriber set 50, the CO 10 initially transmits spread spectrum modulated data at a nominal power level to accommodate any subscriber loop length. The subscriber set 50 then operates to measure the power level of the spread spectrum modulated data received. Based on this measurement, the subscriber set 50 then instructs the CO 10 to raise or lower the spread spectrum modulated data power for optimal reception at the subscriber set 50.

In the subscriber set 50, the DSP block 72 is responsible for measuring the power level of the spread spectrum modulated data received. As noted above, the CO 10 initiates all of its transmissions to the subscriber set 50 at a nominal power level. When the subscriber set 50 detects the presence of spread spectrum modulated data in the subscriber line signal, the DSP block 72 proceeds to measure the amplitude of the QPSK envelope containing the spread spectrum modulated data and average the result over a number of received bits. The DSP block 72 performs this power measurement to determine the power level of the spread spectrum modulated data received at the tip and ring leads. Once determined, the power measurement is then sent to the microprocessor 74 for processing. The microprocessor 74 has a preprogrammed window of acceptable power levels for the spread spectrum modulated data to ensure minimum noise on the tip and ring leads. If the microprocessor 74 deems that the measured power level of the spread spectrum modulated data is too high or too low, it will send a "set power level" message to the local CO 10 encapsulated into an acknowledgement message to acknowledge transmission.

The acknowledgement message is sent to the CO 10 in the same spread spectrum manner data is transmitted from the CO 10 to the subscriber set 50. More specifically, when the microprocessor 74 initiates a set power level command, it encapsulates it into an acknowledgement message which is then sent to the DSP block 72. At the DSP block 72, the acknowledgement message sent by the microprocessor 74 is initially spread spectrum modulated to spread the message spectrum over a band equivalent to the entire subscriber line pass band (or a substantial portion thereof). After this spread spectrum modulation, the message is QPSK modulated to confine the spread message spectrum within the subscriber line pass band. The QPSK modulated message is then applied to the tip and ring leads for transmission to the local CO 10.

At the CO 10, the QPSK modulated message is received, QPSK demodulated and subsequently spread spectrum correlated in the manner described above. When the CO microprocessor 26 receives the acknowledgement message from the subscriber set 50, it will adjust the transmit power level of the spread spectrum modulated data appropriately according to the set power level command contained therein. The CO 10 also operates to store in memory the set power level command sent for use in subsequent transmission attempts.

If the CO 10 does not receive an acknowledgement message on any particular transmission, the CO 10 maintains its transmission power at a nominal level. For situations where an acknowledgement message was previously issued by the subscriber set 50 to reduce the transmit power and in a subsequent transmission, no acknowledgment is sent to the CO 10, the CO 10 will revert back to transmitting at a nominal (higher) power level. In this manner, the CO 10 will still be able to communicate with the subscriber set 50 even if it is plugged into another outlet with a different loop length, or if a parallel set goes off-hook during transmission.

It is important to note that the subscriber set microprocessor 74 will continually check the power level of the incoming spread spectrum modulated data and may issue subsequent "set power level" commands to the CO 10 during transmission as it deems necessary. In this way, only the minimum spread spectrum power necessary for proper data transmission is received at the subscriber set 50 and thus the noise heard by the first subscriber as a result of transmitting the spread spectrum modulated data is minimized.

According to the invention, the CO transmit power can also be controlled without any measurement feedback from the subscriber set 50. Instead, dual tone multi-frequency (DTMF) signals sent by the subscriber set 50 as it receives a telephone call can be used by the CO 10 to adjust its spread spectrum modulated data transmit power. According to this method, the CO 10 can measure the level of the DTMF signals it receives from the subscriber set 50 using known DSP techniques to estimate the length of the subscriber's telephone line. With knowledge of the approximate line length, the CO 10 can then send spread spectrum modulated data at the appropriate transmit power level for optimal reception at the subscriber set.

After proper adjustment of the spread spectrum modulated data transmit power level, the CO 10 begins or resumes transmission of the spread spectrum modulated data at the adjusted power level until all of the bytes forming the name and telephone number of the third party calling have been received. When this occurs, the microprocessor 74 reassembles the bytes received into a digital message representative of the name and telephone number of the third party calling and forwards it to the register 80 of the display module 78. The display module 78 takes the digital message stored in the register 80 and applies it to the visual display unit 82 thereby alerting the first subscriber as to the name and number of the third party calling.

At this particular point, the first subscriber is then in a position to decide whether or not to accept the waiting call based on the identity of the caller. Acceptance of the waiting call simply entails generating a hook switch flash in the conventional manner whereas rejection of the waiting call is achieved by ignoring it. If the first subscriber ignores the waiting call, the local CO 10 may generate a second spread spectrum modulated signal after a predetermined period.

Although embodiments of the invention have been described above, it is not limited thereto and it will be apparent to those skilled in the art that numerous modifications form part of the present invention insofar as they do not depart from the spirit, nature and scope of the claimed and described invention.

The invention has been described above in relation to off-hook services according to which data transfers to a first subscriber engaged in a audio call via a local central office are used to signal that a third party is attempting to reach the first subscriber. It is to be understood that the invention can also be used with other types of off-hook or on-hook services such as, for example, calling line identification (CLID), E-mail messaging, weather and stock reporting services.

Further, the invention has been primarily described with respect to data transfers from the local CO to a subscriber set used by the first subscriber. It is to be understood that the invention is not restricted thereto and can also be used according to the above-described principles for data transfers from the subscriber set to the local CO. Furthermore, the invention is not restricted to central office applications and can also be used in other switches such as a private branch exchange (PBX) switch and a key switch unit (KSU). More generally, it is to be understood that the invention can be used and incorporated in any communication system where it is desirable to transmit data from a transmitter to a receiver via an analog audio communication channel without disrupting or interrupting concurrent analog audio transmissions.

While the invention was discussed using a conventional subscriber set into which is integrated special circuitry to realize the invention, the same or equivalent results may be obtained with an adjunct box containing the described circuitry properly connected to a conventional telephone set.

Similarly, the additional circuitry incorporated in the local CO and described above as being incorporated therein can also be contained in a stand-alone unit connected to the local CO in the manner described above.

Further, the invention has been described in relation to a QPSK digital modulation scheme which provides a 0.5 Hz per bit spectral efficiency. It is understood that other digital modulation techniques featuring higher (or lower e.g. FSK) spectral efficiencies such as multi-level phase shift keying could also be used.

The data transmitted has been described above as being spread spectrum modulated over the entire subscriber line pass band or a substantial portion thereof. It is to be understood that the data spread could alternatively be limited to a smaller portion of the available transmission bandwidth. This could be useful where a higher noise level can be tolerated or the data can be transmitted at a lower rate. For example, if, for the same transmission rate a higher noise level can be tolerated, the data could be spread spectrum modulated over half the transmission bandwidth. Alternatively, if for a constant noise level data can be transmitted at half the transmission rate, this data could also be spread spectrum modulated over only half the transmission bandwidth.

Spread spectrum modulation over only a portion of the available bandwidth could also be useful where multiple data channels are necessary. For example, instead of implementing a single data channel at a particular transmission rate, the available bandwidth could be shared equally to support 2 separate data channels for the same noise level and half the transmission rate in each channel. This would be particularly useful for full-duplex applications. This bi-directional channel arrangement could also be used as an alternative to the half duplex implementation of the power control feature described above. More specifically, a first channel (e.g. extending from 50 Hz to 1775 Hz) could be used for transmissions originated by the CO to the subscriber set while a second channel (e.g. extending from 1775 Hz to 3500 Hz) would be dedicated to transmissions initiated by the subscriber set such as acknowledgement messages.

We claim:

1. A method of transmitting caller identification (ID) information via a subscriber line signal of an analog audio communication channel having a subscriber line pass band, the method comprising:

receiving caller ID information of a third party attempting to communicate with a subscriber via a subscriber line;

forming a data signal comprising the caller ID information;

modulating the data signal by spread spectrum modulation to produce a spread spectrum modulated data signal, the spread spectrum modulated data signal spread over at least a substantial portion of the subscriber line pass band; and outputting the spread spectrum modulated data signal for transmission via the analog audio communication channel to be received by a first subscriber.

2. The method in accordance with claim 1 wherein the data signal is used for off-hook data services and on-hook data services.

3. The method in accordance with claim 1 wherein outputting the spread spectrum modulated data signal for transmission via the analog audio communication channel further comprises:
  converting the spread spectrum modulated data signal into an analog form; and
  combining the analog spread spectrum modulated data signal with an audio signal to form a composite signal for transmission via the analog audio communication channel.

4. The method in accordance with claim 3 wherein converting the spread spectrum modulated data signal into an analog form further comprises:
  modulating a carrier frequency having a frequency within the subscriber line pass band.

5. The method in accordance with claim 3 wherein the data signal is used for an off-hook data service during an on-going audio call between the first subscriber and a second subscriber.

6. The method in accordance with claim 5 wherein the caller ID information is associated to a third party calling the first subscriber during the on-going audio call between the first subscriber and the second subscriber.

7. The method in accordance with claim 5 further comprising:
  adjusting the power level of the spread spectrum modulated data signal in response to a power control data signal received from the first subscriber.

8. The method in accordance with claim 7 wherein the power control data signal comprises a spread spectrum modulated data signal generated by the first subscriber.

9. The method in accordance with claim 1 wherein the data signal comprises a digital bit stream, and modulating the data signal by spread spectrum modulation further comprises:
  digitally spreading the digital bit stream using a code.

10. The method in accordance with claim 9 wherein the digital
  bit stream comprises a plurality of logic zeros and logic ones, and the digitally spreading further comprises:
  replacing each logic zero with an N-bit pattern; and
  replacing each logic one with an inverse of the N-bit pattern.

11. An apparatus for transmitting caller identification (ID) information via a subscriber line signal of an analog audio communication channel having a subscriber line pass band, the apparatus comprising:
  means for receiving caller ID information of a third party attempting to communicate with a subscriber via a subscriber line;
  a processing unit operable for forming a data signal comprising the caller ID information;
  a digital signal processing unit coupled to the processing unit operable for modulating the data signal by spread spectrum modulation to produce a spread spectrum modulated data signal, the spread spectrum modulated data signal spread over at least a substantial portion of the subscriber line pass band; and
  means for outputting the spread spectrum modulated data signal for transmission via the analog audio communication channel to be received by a first subscriber.

12. The apparatus in accordance with claim 11 wherein the data signal is used for off-hook data services and on-hook data services.

13. The apparatus in accordance with claim 11 further comprising:
  a digital-to-analog (D/A) converter coupled to the digital signal processor and operable for converting the spread spectrum modulated data signal into an analog form.

14. The apparatus in accordance with claim 13 wherein the digital signal processor is further operable for modulating a carrier frequency having a frequency within the subscriber line pass band.

15. The apparatus in accordance with claim 13 wherein the data signal is used for an off-hook data service during an on-going audio call between the first subscriber and a second subscriber.

16. The apparatus in accordance with claim 15 wherein the caller ID information is associated to a third party calling the first subscriber during the on-going audio call between the first subscriber and the second subscriber.

17. The apparatus in accordance with claim 13 wherein the digital signal processor is further operable for adjusting the power level of the spread spectrum modulated data signal in response to a power control data signal received from the first subscriber.

18. The apparatus in accordance with claim 11 wherein the data signal comprises a digital bit stream, and the digital signal processor is further operable for digitally spreading the digital bit stream using a code.

19. The apparatus in accordance with claim 18 wherein the digital bit stream comprises a plurality of logic zeros and logic ones, and the digitally spreading further comprises:
  replacing each logic zero with an N-bit pattern; and
  replacing each logic one with an inverse of the N-bit pattern.

20. A subscriber set for receiving caller identification (ID) information via a subscriber line signal of an analog audio communication channel having a subscriber line pass band, the subscriber set comprising:
  an analog-to-digital (A/D) converter operable for converting an analog spread spectrum modulated data signal received from the analog audio communication channel to a digital spread spectrum modulated data signal, the analog spread spectrum modulated data signal spread over at least a substantial portion of the subscriber line pass band;
  a digital signal processing unit coupled to the A/D converter and operable for demodulating the digital spread spectrum modulated data signal to recover a data signal comprising the caller ID information;
  a processing unit coupled to the digital signal processor and operable for receiving the data signal; and
  a means for conveying information related to the caller ID information to a first subscriber.

21. The subscriber set in accordance with claim 20 wherein the means for conveying information comprises a ring detection circuit.

22. The subscriber set in accordance with claim 20 wherein the means for conveying information comprises a display unit coupled to the processing unit and operable for displaying the caller ID information.

23. The subscriber set in accordance with claim 20 wherein the digital signal processor is further operable for demodulating the digital spread spectrum modulated data signal with a carrier frequency having a frequency within the subscriber line pass band.

24. The subscriber set in accordance with claim 20 wherein the data signal is used for an off-hook data service during an on-going audio call between a first subscriber and a second subscriber.

25. The subscriber set in accordance with claim 24 wherein the caller ID information is associated to a third party calling the first subscriber during the on-going audio call between the first subscriber and the second subscriber.

26. The subscriber set in accordance with claim 20 wherein the digital signal processor is further operable for measuring the power level of the received spread spectrum modulated data signal and generating a power control data signal for transmission from the subscriber set over the audio communication channel.

27. The subscriber set in accordance with claim 20 wherein the digital signal processor is further operable for spread spectrum correlating the demodulated data signal using a known code to recover a digital bit stream.

28. The subscriber set in accordance with claim 27 wherein the digital bit stream comprises a plurality of logic zeros and logic ones comprising the caller ID information, and wherein correlating the demodulated data signal further comprises:

recovering each logic zero of the digital bit stream by replacing each N-bit pattern of the demodulated data signal with the logic zero; and recovering each logic one of the digital bit stream by replacing each inverse of the N-bit pattern of the demodulated data signal with the logic one.

29. A method of transmitting information via a subscriber line signal of an analog audio communication channel having a subscriber line pass band, the method comprising:

forming a data signal comprising the information, the data signal comprising a digital bit stream having a plurality of logic zeros and logic ones;

modulating the data signal by spread spectrum modulation to produce a spread spectrum modulated data signal, the spread spectrum modulated data signal spread over at least a substantial portion of the subscriber line pass band, whereby modulating the data signal by spread spectrum modulation further comprises:

digitally spreading the digital bit stream using a code, replacing each logic zero with an N-bit pattern, and replacing each logic one with an inverse of the N-bit pattern; and outputting the spread spectrum modulated data signal for transmission via the analog audio communication channel to be received by a first subscriber.

30. An apparatus for transmitting information via a subscriber line signal of an analog audio communication channel having a subscriber line pass band, the apparatus comprising:

a processing unit operable for forming a data signal comprising the information, the data signal comprising a digital bit stream having a plurality of logic zeros and logic ones;

a digital signal processing unit coupled to the processing unit operable for modulating the data signal by spread spectrum modulation to produce a spread spectrum modulated data signal, the spread spectrum modulated data signal spread over at least a substantial portion of the subscriber line pass band, whereby modulating the data signal by spread spectrum modulation further comprises:

digitally spreading the digital bit stream using a code, replacing each logic zero with an N-bit pattern, and replacing each logic one with an inverse of the N-bit pattern; and means for outputting the spread spectrum modulated data signal for transmission via the analog audio communication channel to be received by a first subscriber.

31. A subscriber set for receiving information via a subscriber line signal of an analog audio communication channel having a subscriber line pass band, the subscriber set comprising:

an analog-to-digital (A/D) converter operable for converting an analog spread spectrum modulated data signal received from the analog audio communication channel to a digital spread spectrum modulated data signal, the analog spread spectrum modulated data signal spread over at least a substantial portion of the subscriber line pass band;

a digital signal processing unit coupled to the A/D converter and operable for demodulating the digital spread spectrum modulated data signal to recover a data signal comprising the information, the recovered data signal having a plurality of logic zeros and logic ones, and whereby demodulating the digital spread spectrum modulated data signal further comprises:

correlating using a code, recovering each logic zero of the data signal by replacing each N-bit pattern of the digital spread spectrum modulated data signal with the logic zero, and recovering each logic one of the data signal by replacing each inverse of the N-bit pattern of the digital spread spectrum modulated data signal with the logic one;

a processing unit coupled to the digital signal processor and operable for receiving the data signal; and a means for conveying information related to the caller ID information to a first subscriber.

* * * * *

UNITED STATES PATENT AND TRADEMARK OFFICE
CERTIFICATE OF CORRECTION

PATENT NO. : 6,792,030 B2
DATED : September 14, 2004
INVENTOR(S) : Michael C.G. Lee and Frederic Simard

It is certified that error appears in the above-identified patent and that said Letters Patent is hereby corrected as shown below:

<u>Column 6,</u>
Line 19, delete "QSPK" and insert -- QPSK --.

<u>Column 9,</u>
Line 30, delete "(12.4dB)" and insert -- (18.5dB) --.

Signed and Sealed this

Twenty-second Day of March, 2005

JON W. DUDAS
*Director of the United States Patent and Trademark Office*